(12) United States Patent
Diss et al.

(10) Patent No.: US 11,655,193 B2
(45) Date of Patent: May 23, 2023

(54) METHOD FOR INJECTING A LOADED SUSPENSION INTO A FIBROUS TEXTURE AND METHOD FOR MANUFACTURING A PART MADE OF COMPOSITE MATERIAL

(71) Applicant: SAFRAN CERAMICS, Le Haillan (FR)

(72) Inventors: Pascal Diss, Moissy-Cramayel (FR); Eric Lavasserie, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 648 days.

(21) Appl. No.: 16/648,427

(22) PCT Filed: Sep. 18, 2018

(86) PCT No.: PCT/FR2018/052283
§ 371 (c)(1),
(2) Date: Mar. 18, 2020

(87) PCT Pub. No.: WO2019/058050
PCT Pub. Date: Mar. 28, 2019

(65) Prior Publication Data
US 2021/0362368 A1    Nov. 25, 2021

(30) Foreign Application Priority Data

Sep. 19, 2017 (FR) ........................ 1758658

(51) Int. Cl.
*C04B 35/622* (2006.01)
*C04B 35/80* (2006.01)
(Continued)

(52) U.S. Cl.
CPC ........ *C04B 35/62227* (2013.01); *B28B 1/008* (2013.01); *B28B 1/24* (2013.01);
(Continued)

(58) Field of Classification Search
CPC ........................... B28B 1/52; C04B 35/71–83
See application file for complete search history.

(56) References Cited

U.S. PATENT DOCUMENTS

| 2011/0311368 A1 | 12/2011 | Coupe et al. |
| 2014/0106069 A1 | 4/2014 | Ohlendorf et al. |
| (Continued) | | |

FOREIGN PATENT DOCUMENTS

| CN | 10455274 A | 4/2015 |
| CN | 106029607 A | 10/2016 |
| (Continued) | | |

OTHER PUBLICATIONS

JP-10169178-A (Nishigami) Jun. 23, 1998 (English language machine translation). [online] [retrieved Dec. 14, 2022]. Retrieved from: Espacenet. (Year: 1998).*

(Continued)

*Primary Examiner* — Erin Snelting
(74) *Attorney, Agent, or Firm* — Pillsbury Winthrop Shaw Pittman LLP

(57) ABSTRACT

A method for injecting a loaded suspension into a fibrous texture having a three-dimensional or multilayer weaving includes the injection of a suspension containing a powder of solid particles into the volume of the fibrous texture. The injection of the loaded suspension is carried out by at least one hollow needle in communication with a loaded suspension supply device, each needle being movable in at least one direction extending between a first face and a second opposite face of the fibrous texture so as to inject the loaded suspension at one or more determined depths in the fibrous texture.

11 Claims, 2 Drawing Sheets

(51) Int. Cl.
  *B28B 1/00* (2006.01)
  *B28B 1/52* (2006.01)
  *C04B 35/10* (2006.01)
  *C04B 35/117* (2006.01)
  *C04B 35/14* (2006.01)
  *C04B 35/16* (2006.01)
  *C04B 35/185* (2006.01)
  *C04B 35/447* (2006.01)
  *C04B 35/486* (2006.01)
  *C04B 35/565* (2006.01)
  *C04B 35/58* (2006.01)
  *B28B 1/24* (2006.01)
  *D03D 25/00* (2006.01)

(52) U.S. Cl.
  CPC ............... *B28B 1/52* (2013.01); *C04B 35/10* (2013.01); *C04B 35/117* (2013.01); *C04B 35/14* (2013.01); *C04B 35/16* (2013.01); *C04B 35/185* (2013.01); *C04B 35/447* (2013.01); *C04B 35/486* (2013.01); *C04B 35/565* (2013.01); *C04B 35/58* (2013.01); *C04B 35/5805* (2013.01); *C04B 35/80* (2013.01); *C04B 2235/616* (2013.01); *D03D 25/005* (2013.01)

(56) References Cited

U.S. PATENT DOCUMENTS

| 2014/0217652 A1 | 8/2014 | Varin et al. |
| 2015/0086901 A1 | 3/2015 | Tatsuno |
| 2015/0104638 A1 | 4/2015 | Jeltsch et al. |
| 2016/0362822 A1 | 12/2016 | Diss et al. |
| 2018/0297901 A1 | 10/2018 | Droz et al. |

FOREIGN PATENT DOCUMENTS

| CN | 106866151 A | 6/2017 | | |
| DE | 10 2007 037680 A1 | 2/2009 | | |
| EP | 0 521 747 A1 | 1/1993 | | |
| EP | 2 833 450 A1 | 2/2015 | | |
| EP | 2 942 111 A2 | 11/2015 | | |
| FR | 3 030 502 A1 | 6/2016 | | |
| FR | 3 041 890 A1 | 4/2017 | | |
| JP | H07-76891 A | 3/1995 | | |
| JP | 10169178 A | * | 6/1998 | |
| JP | H11-32730 A | 2/1999 | | |
| RU | 2518622 C2 | 6/2014 | | |
| RU | 2607216 C2 | 1/2017 | | |
| WO | 2559440 C2 | 8/2015 | | |
| WO | WO-2015124872 A1 | * | 8/2015 | ........... B28B 13/021 |
| WO | WO 2016/102839 A1 | 6/2016 | | |
| WO | WO 2016/193569 A1 | 12/2016 | | |
| WO | WO 2017/060601 A1 | 4/2017 | | |

OTHER PUBLICATIONS

International Search Report as issued in International Patent Application No. PCT/FR2018/052283, dated Nov. 6, 2018.
Notification under Article 94(3) CBE as issued in European Patent Application No. 18782123.6, dated Jan. 27, 2023.

* cited by examiner

METHOD FOR INJECTING A LOADED SUSPENSION INTO A FIBROUS TEXTURE AND METHOD FOR MANUFACTURING A PART MADE OF COMPOSITE MATERIAL

CROSS-REFERENCE TO RELATED APPLICATIONS

This application is the U.S. National Stage of PCT/FR2018/052283, filed Sep. 18, 2018, which in turn claims priority to French patent application number 1758658 filed Sep. 19, 2017. The content of these applications are incorporated herein by reference in their entireties.

BACKGROUND OF THE INVENTION

The present invention relates to a method for injecting a loaded suspension into a fibrous texture for the manufacture of parts made of composite material by liquid process.

In the field of the preparation of composite materials by liquid process, numerous alternative methods have been developed with the common objective of filling the entire volume available in a fibrous preform with a suspension sufficiently loaded to obtain the lowest possible final porosity.

Among the solutions with liquid process, one of them consists of using fibrous layers pre-impregnated with a loaded suspension and of draping them over a shaping tooling. However, this technique is not compatible with textures having a three-dimensional (3D) or multilayer (2.5D) weaving. These textures are indeed difficult to impregnate by a conventional means due to the "filter" effect of the texture which prevents the homogeneous penetration of the loaded suspension throughout the thickness of the texture. This type of preparation method allows producing only parts made of composite material having a small thickness and a two-dimensional (2D) fibrous reinforcement. The mechanical characteristics of these types of composite material remain limited in some directions. Particularly, these materials have a low resistance to delamination and do not withstand shear forces.

There are also injection, infusion or sedimentation type methods, based on the introduction of a loaded suspension which is diluted (having a viscosity adapted to a homogeneous penetration in the texture) and filtered in situ, so as to concentrate it to obtain at the final stage the desired level of porosity. Such a method is in particular described in document WO 2016/102839.

However, in the case of a 3D or 2.5D woven texture, the impregnation of the fibrous texture is long and delicate due to the complex shape and to the high thickness of the texture. Thus, the phase of injecting or filling the fibrous texture with the loaded suspension is not controlled, which leads to the presence of porosities in the final part. These methods therefore require carrying out significant development works, based on:

- the development of a suitable suspension,
- the modeling of the flows within the preform,
- the development of a specific tooling specific to a given geometry (with in particular the location of the injection and filtration points) and associated method parameters (pressure, temperature, duration, flow rate, . . . ).

These implementation constraints have a significant impact on the development and implementation costs. In addition, it is difficult to design an injection tooling which adapts to different geometries of the parts to be manufactured.

OBJECT AND SUMMARY OF THE INVENTION

The object of the present invention is to overcome the aforementioned drawbacks and to propose a solution that allows better controlling the phase of injecting or filling a 3D or 2.5D fibrous texture with a loaded suspension in order to obtain a material or a part with a very low macroporosity rate while being able to easily adapt to the different geometries of envisaged parts.

To this end, the invention proposes a method for injecting a loaded suspension into a fibrous texture having a three-dimensional or multilayer weaving comprising the injection of a suspension containing a powder of solid particles into the volume of the fibrous texture, characterized in that the injection of the loaded suspension is carried out by means of at least one hollow needle in communication with a loaded suspension supply device, each needle being movable in at least one direction extending between a first face and a second opposite face of the fibrous texture so as to inject the loaded suspension at one or more determined depths in the fibrous texture.

By using one or more needles, it is possible to inject the loaded suspension directly in the core of the fibrous texture. The duration of injection and the control thereof in 3D or 2.5D textures are significantly improved compared to conventional liquid process methods since it suffices to locally cross the thickness of the texture and move the needle(s) in the latter.

In addition, with the method of the invention, there is very little pressure loss (and "filter" effect of the texture) since the loaded suspension is locally injected at each needle and in limited quantity. It is thus possible to inject a suspension highly loaded with particles and therefore to suppress the step of draining the liquid phase which i generally necessary with the prior methods in which the liquid phase must be predominant to allow its penetration throughout the texture from one of these faces.

The method of the invention also has great adaptability to variations in the geometries because it is possible to adjust the position and the depth of penetration of each needle into the fibrous texture, regardless of its geometry.

According to a particular characteristic of the injection method of the invention, each hollow needle preferably has an external diameter of between 0.4 mm and 0.8 mm, which allows penetrating the fibrous texture without disturbing its architecture, particularly its weaving, while being compatible with the dimensions of the solid fillers present in the suspension to be injected.

According to another particular characteristic of the injection method of the invention, the hollow needle(s) preferably has/have a beveled end in order to further facilitate their penetration in the fibrous texture and particularly into the strands, that is to say in the intra-yarn spaces.

According to another particular characteristic of the injection method of the invention, the needle(s) is/are moved sequentially between a first face and a second opposite face of the fibrous texture, the needle(s) being stopped at intermediate positions between these two faces, a determined dose of loaded suspension being injected into the texture at each intermediate position. This ensures homogeneous filling of the fibrous texture by locally controlling the position of injection of the loaded suspension into the texture and the delivered quantity thereof.

According to yet another particular characteristic of the injection method of the invention, the needle(s) is/are moved continuously between a first face and a second opposite face of the fibrous texture, the loaded suspension being injected continuously at a determined flow rate into the fibrous texture. This ensures a gradual and homogeneous filling of the fibrous texture.

The fibrous texture can be compacted before or after the injection of the loaded suspension in order to reach a targeted fiber ratio. In the first case, during the injection of the loaded suspension, the fibrous texture is placed in a compaction tooling comprising at least on one face one or more through holes for the needle(s).

The invention also relates to a method for manufacturing a part made of composite material comprising:
- the formation of a fibrous texture by three-dimensional or multilayer weaving between a plurality of yarns,
- the injection of a loaded suspension into the fibrous texture according to the invention, the loaded suspension comprising at least one liquid or solid precursor of a matrix,
- the compaction of the injected fibrous texture,
- the transformation of said at least one precursor into a matrix.

According to a particular characteristic of the manufacturing method of the invention, the yarns of the fibrous texture are formed of refractory ceramic fibers, the loaded suspension containing refractory ceramic particles as a solid precursor of a ceramic matrix, the method comprising the heat treatment of the refractory ceramic particles present in the fibrous texture in order to form a refractory ceramic matrix in said texture.

The yarns of the fibrous texture can be in particular, but not exclusively, formed of fibers consisting of one or more of the following materials: the alumina, the mullite, the silica, an aluminosilicate, a borosilicate, silicon carbide and carbon.

The refractory ceramic particles may be in particular, but not exclusively, made of a material chosen from: the alumina, the mullite, the silica, an aluminosilicate, an aluminophosphate, the zirconia, a carbide, a boride and a nitride.

BRIEF DESCRIPTION OF THE DRAWINGS

Other characteristics and advantages of the invention will emerge from the following description of particular embodiments of the invention, given by way of non-limiting examples, with reference to the appended drawings, wherein.

DETAILED DESCRIPTION OF EMBODIMENTS

Figure 1:
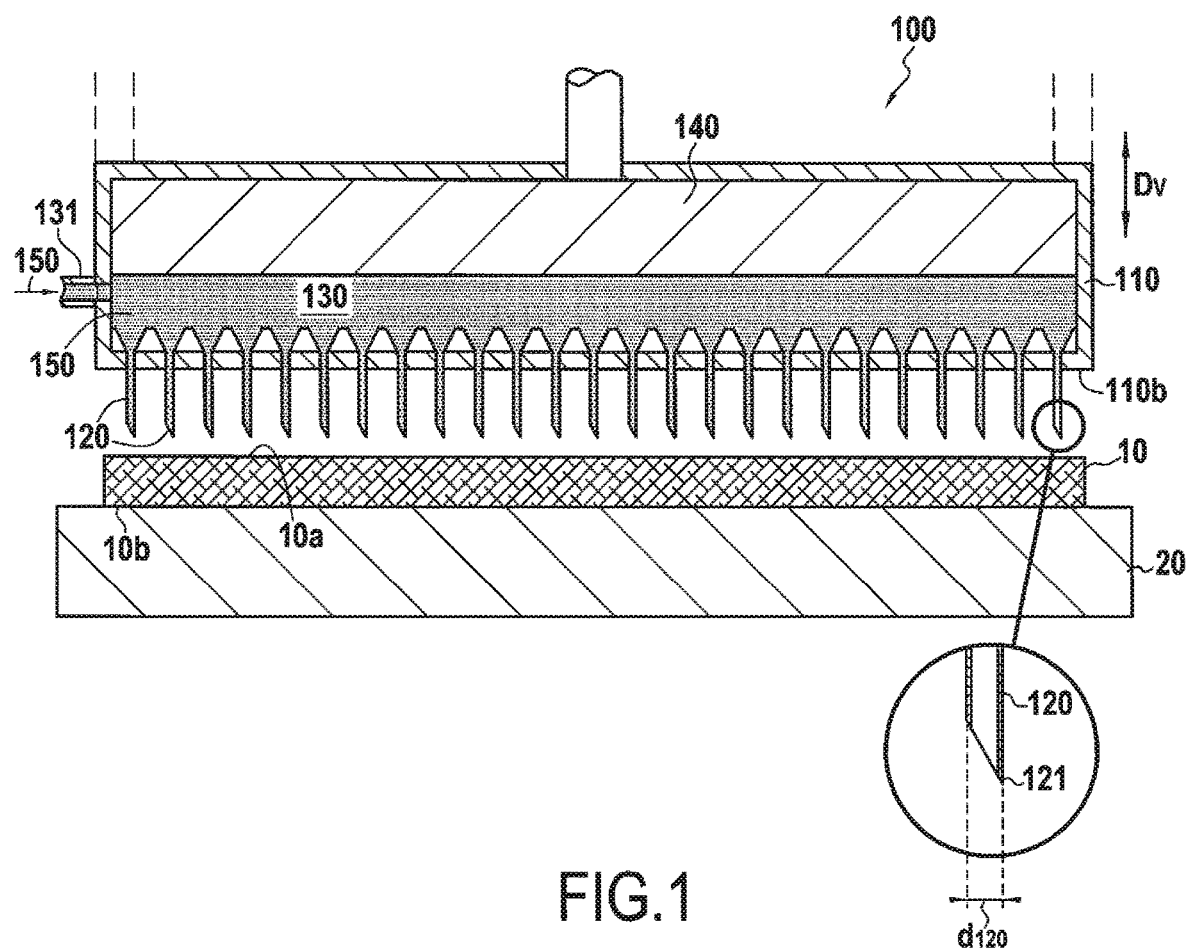
FIG. 1 is a schematic sectional view of an injection tooling according to one embodiment of the invention.

The injection method of the invention applies to the injection of a loaded suspension into fibrous textures obtained by three-dimensional (3D) or multilayer (2.5D) weaving, namely textures having a complex geometry in which it is difficult to introduce and distribute homogeneously solid particles suspended with the methods of the prior art such as for example the injection molding called "RTM" or the submicron powder aspiration called "SPA", due to the "filter" effect of the texture, which prevents the homogeneous penetration of the loaded suspension throughout the thickness of the texture.

The fibrous texture is achieved in a known manner by weaving by means of a jacquard-type loom on which a bundle of warp yarns or strands has been disposed in a plurality of layers, the warp yarns being linked by weft yarns or vice versa. As indicated above, the fibrous texture is achieved by three-dimensional (3D) or multilayer (2.5D) weavings.

By "three-dimensional weaving" or "3D-weaving" or even "multilayer weaving" or "2.5D weaving", is meant here a weaving mode by which at least some of the weft yarns link warp yarns on several layers of warp yarns or vice versa following a weaving corresponding to a weaving pattern which may be in particular chosen from one of the following weaves: interlock, multi-canvas, multi-satin and multi-twill.

By "interlock weave or fabric" is meant here a 3D-weaving pattern whose each layer of warp yarns links several layers of weft yarns with all the yarns of the same warp column having the same movement in the plane of the weave. In the case of a 2.5D weaving, it will be an "interlock warp" which is in the form of a multilayer fabric whose linking between the superimposed layers is ensured by the warp yarns. The weaving technique used is the one of multi-warp weaving on a warp and weft loom during which the opening of the shed is unidirectional unlike 3D-weaving.

By "multi-canvas weave or fabric", is meant here a 3D-weaving with several layers of weft yarns whose basic weave of each layer is equivalent to a weave of the conventional canvas type but with some points of the weave that link the layers of weft yarn together.

By "multi-satin weave or fabric", is meant here a 3D-weaving with several layers of weft yarns whose basic weave of each layer is equivalent to a weave of the conventional satin type but with some points of the weave that link the layers of weft yarn together.

By "multi-twill weave or fabric" is meant here a 3D-weaving with several layers of weft yarns whose basic weave of each layer is equivalent to a weave of the conventional twill type but with some points of the weave that link the weft yarn layers together.

The injection method of the invention applies particularly, but not exclusively, to the production of parts made of oxide/oxide composite material or ceramic matrix composite (CMC) material, that is to say including a fibrous reinforcement formed from fibers made of refractory ceramic material densified by a matrix also made of refractory ceramic material.

The yarns used to weave the fibrous texture intended to form the fibrous reinforcement of the part made of composite material can be in particular formed of fibers consisting of one of the following materials: the alumina, the mullite, the silica, an aluminosilicate, a borosilicate, silicon carbide, carbon or a mixture of several of these materials. The solid particles present in the suspension to be injected into the fibrous texture may in particular consist of a material chosen from: alumina, mullite, silica, aluminosilicates, aluminophosphates, carbides, borides, nitrides and mixtures of such materials.

FIG. 1 illustrates the start of a method for injecting a loaded suspension according to one embodiment of the invention. A fibrous texture 10 obtained by 3D or 2.5D weaving is placed on a support plate 20 so as to present an exposed face 10a facing an injection tooling 100. The injection tooling 100 comprises a casing 110 able to move along a double direction $D_V$ as indicated in FIG. 1. The lower edge 110b of the casing 110 includes a plurality of hollow needles 120 in communication with an injection chamber 130 delimited inside the casing 110 by a piston 140 and the lower edge 110b of the casing. A loaded suspension 150 is introduced into the injection chamber 130 through a port 131. Each hollow needle 120 preferably includes one end 121 which is beveled and has a diameter $d_{120}$ of between 0.4 mm and 0.8 mm. In the example described here, the position of the hollow needles 120 and, more precisely, the position of their ends 121 in the fibrous texture, are controlled by the displacement of the casing 110 along a double direction $D_V$.

Figure 2:
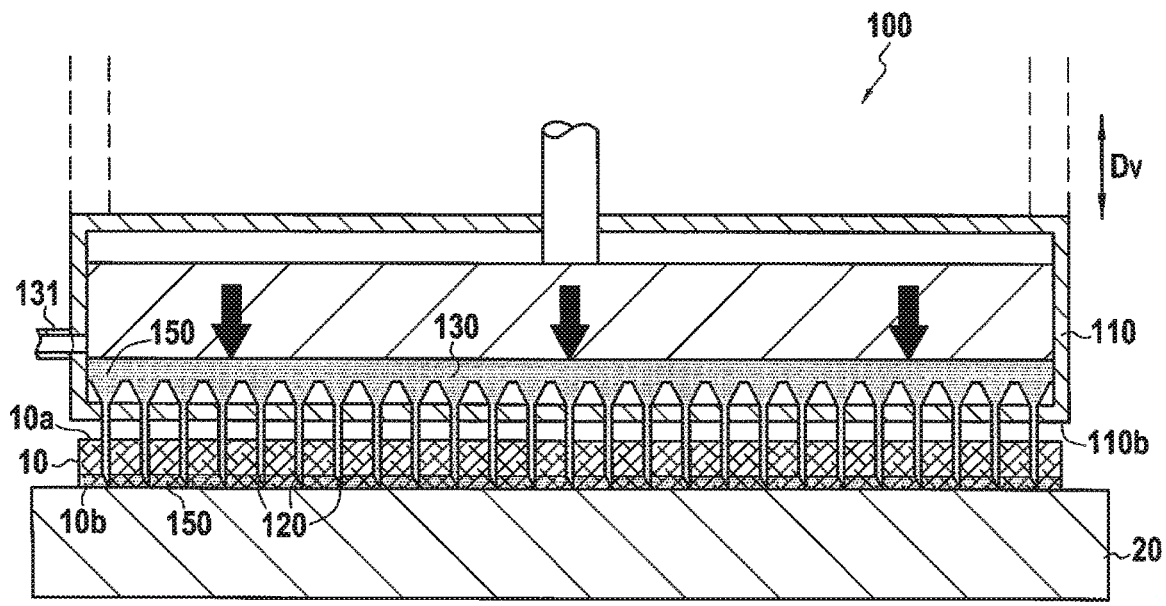
FIGS. 2 to 5 show the gradual injection of a loaded suspension into a fibrous texture with the injection tooling of FIG. 1 according to one embodiment of the invention.
Figure 3:
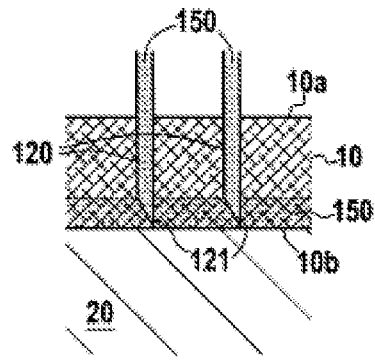
Figure 4:
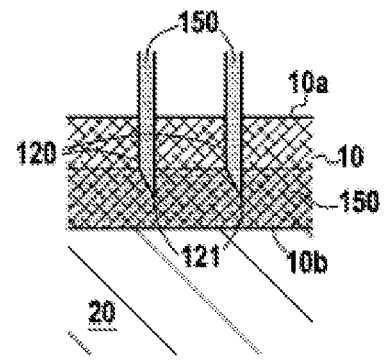
Figure 5:
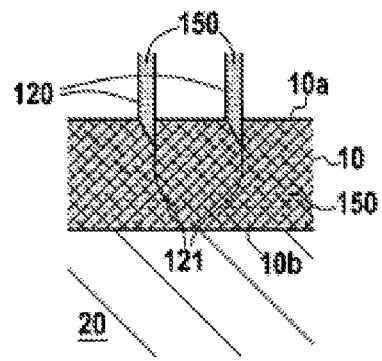

As illustrated in FIG. 2, the injection begins with the positioning of the ends 121 of the hollow needles 120 as close as possible to the lower face 10b of the fibrous texture 10 in contact with the support plate 20, the suspension being then injected into the texture 10 by setting in motion the piston 140 which allows injecting a first quantity of loaded suspension 150 over a determined thickness in the fibrous texture 10. The injection of the loaded suspension 150 into the fibrous texture 10 continues as illustrated in FIGS. 3 to 5 by moving the ends 121 of the hollow needles 120 from the lower face 10b of the texture to the vicinity of the upper face 10a of the fibrous texture 10 so as to fill the fibrous texture throughout its thickness with the loaded suspension 150.

The injection of the loaded suspension 150 into the fibrous texture 10 can be carried out in two ways. The loaded suspension 150 can be injected continuously while the needles are gradually moved between the two opposite faces 10b and 10a of the fibrous texture 10, that is to say from the position illustrated in FIG. 2 to the position illustrated in FIG. 5. The loaded suspension 150 can also be injected sequentially. In this case, the needle(s) is/are moved sequentially between the two opposite faces 10b and 10a of the fibrous texture 10, the needle(s) being stopped at intermediate positions between these two faces, corresponding here to the positions illustrated in FIGS. 2 to 5, a determined dose of loaded suspension being injected into the texture at each intermediate position.

Figure 6:
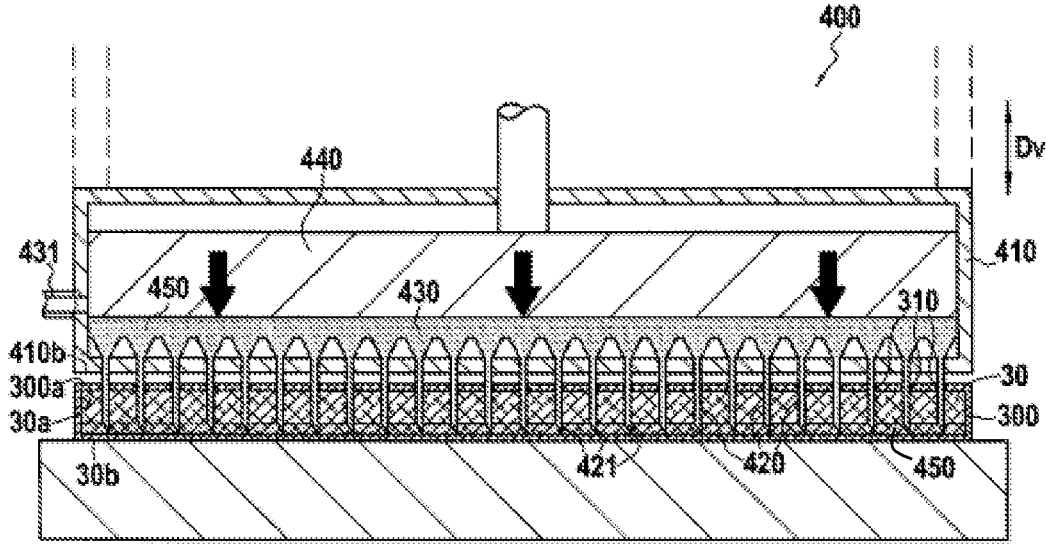
FIG. 6 is a schematic sectional view showing an injection of a loaded suspension into a fibrous texture maintained in a compaction tooling according to another embodiment.

The loaded suspension can be injected into the fibrous texture before its compaction, the latter being carried out subsequently in order to reach in particular a targeted fiber ratio. The loaded suspension can also be injected into the fibrous texture while the latter is already compacted as illustrated in FIG. 6. In FIG. 6, a 3D or 2.5D woven fibrous texture is maintained in a compaction tooling 300 able to apply thereon in a determined compaction rate. The tooling 300 includes on its face 300a facing an injection tooling 400 a plurality of perforations 310 intended to allow the passage of needles 420 of the injection tooling. The injection tooling 400 is similar to the injection tooling 100 described above, namely it comprises a casing 410 able to move along a double direction $D_V$ as indicated in FIG. 6. The lower edge 410b of the casing 410 includes a plurality of hollow needles 420 in communication with an injection chamber 430 delimited inside the casing 410 by a piston 440 and the lower edge 410b of the casing. A loaded suspension 450 is introduced into the injection chamber 430 through a port 431. Each hollow needle 420 preferably includes one end 421 which is beveled and which has a diameter of between 0.4 mm and 0.8 mm.

The injection of the loaded suspension 450 into the fibrous texture 30 is carried out as already described above in relation to FIGS. 2 to 5, that is to say by moving the ends 421 of the hollow needles 420 from the lower face 30b of the texture to the vicinity of the upper face 30a of the fibrous texture 30 so as to fill the fibrous texture throughout its thickness with the loaded suspension 450. The injection of the loaded suspension 450 into the fibrous texture 30 can be carried out continuously or sequentially.

In the examples described above, the injection of the loaded suspension is carried out by means of a plurality of hollow needles extending along the same row aligned with one of the dimensions of the texture, for example its width. In this case, after each injection throughout the entire thickness of the fibrous texture, the needles are moved in the lengthwise direction of the texture according to a determined pitch in order to cover the entire texture with the local injection of loaded suspension. According to an alternative embodiment, the injection tooling can include a matrix of hollow needles extending both in the widthwise and lengthwise directions of the fibrous texture, the matrix of needles being possibly moved in the direction of the width and/or of the length of the texture when the matrix does not entirely cover the exposed surface of the fibrous texture.

According to another alternative embodiment, the injection method is implemented with a single needle which is moved in different directions relative to the fibrous texture in order to inject the loaded suspension throughout the volume of the fibrous texture.

Once the fibrous texture is injected with the loaded suspension, it is shaped by being possibly compacted according to a compaction rate making it possible to obtain a determined fiber ratio.

When the liquid phase of the suspension does not correspond to a matrix precursor as it is the case in particular with an aqueous solution, it is not necessary to remove it from the preform unlike the methods of the art prior. Indeed, thanks to the injection of the loaded suspension by means of one or more hollow needles in the core of the texture, it is possible to use suspensions having a high viscosity, that is to say suspensions comprising a small proportion of liquid phase in comparison with the proportion of solid fillers. Thanks to the present invention, it is possible to implement loaded suspensions whose viscosity can reach 10,000 mPa·s, against only 400 mPa·s at the very most for injection methods of prior art such as the methods of the type injection molding (RTM) or submicron powder aspiration (SPA). In practice, this means that it is possible to implement suspensions containing a mass fraction of filler of up to 85% by mass. The ability of the method of the invention to implement such concentrated suspensions reduces very significantly the duration of the operation of injection of the suspensions. In this case, the small amount of liquid phase is eliminated naturally during the heat treatment for transforming the solid fillers into a matrix. However, if necessary, the preform can be dried before the transformation of the solid fillers.

The preform is then subjected to a heat treatment in order to transform the matrix precursor(s) present in the loaded suspension injected.

In the case of the production of a part made of oxide/oxide or CMC composite material, the heat treatment consists in sintering the solid particles in order to form the matrix in the preform.

The invention is not limited to the production of a part made of oxide/oxide or CMC composite material. The invention can also be applied to the manufacture of a part made of an organic matrix composite material, the matrix in this case being loaded with solid particles. By way of example, the fibrous structure can be achieved by 3D or 2.5D weaving between carbon yarns and injected according to the method of the invention with a loaded suspension comprising an epoxy-type resin and solid fillers consisting of black carbon, carbides, or oxides. In this case, the heat treatment for transforming the matrix precursor consists in polymerizing the resin.

A test for implementing a method according to the invention was carried out. This consisted in injecting a fibrous texture obtained by interlock weaving with Nextel 610™ alumina yarns with a thread count of 8 yarns/cm. The dimensions of the injected texture are 120 mm in length, 100 mm in width and 5 mm in thickness with a loaded suspension comprising 60% by mass of an alpha alumina powder marketed by the company Baikowski under the name SM8 (D50=0.3 µm approximately) and 40% by mass of an aqueous solution with 50% of monoaluminium phosphate $Al(H_2PO_4)_3$.

The loaded suspension has been injected with a single hollow needle with a diameter of 0.8 mm and having a beveled end, the needle being connected to an injection syringe. At each injection position, the needle is gradually moved through the thickness of the fibrous texture (progressive withdrawal of the needle between two opposite faces of the texture) at a speed of 6 cm/min with continuous injection of the suspension. The entire texture is injected by multiplying the injection points with the needle, the latter being moved by one pitch of 1 cm between each injection position in the two dimensions of the texture (width and length). The injection of the texture in its entire volume under the conditions described above was carried out in 10 minutes. For comparison, the same injection of this texture with injection methods of the prior art such as the methods of the type injection molding (RTM) or of submicron powder aspiration (SPA) takes several hours.

Once the injection is completed, a molding of the texture is carried out under a pressure of 5 bars and at a temperature of 350° C. A heat treatment for sintering the alumina particles is then carried out at 850° C. under ambient atmosphere.

A part made of oxide/oxide composite material which has a fiber volume ratio of 45% and a porosity ratio of 24% is obtained.

The invention claimed is:

1. A method for injecting a loaded suspension into a fibrous texture having a three-dimensional or multilayer weaving in which at least some of weft yarns link warp yarns on several layers of warp yarns or vice versa, said method comprising injecting a suspension containing a powder of solid particles into a volume of the fibrous texture, wherein the injecting of the loaded suspension is carried out by means of at least one hollow needle in communication with a loaded suspension supply device, each needle being configured to cross a thickness of the fibrous texture and move in at least one direction extending between a first face and a second opposite face of the fibrous texture so as to inject the loaded suspension at a plurality of determined depths in the fibrous texture as a result of the movement of the needle.

2. The method according to claim 1, wherein each hollow needle has an external diameter of between 0.4 mm and 0.8 mm.

3. The method according to claim 1, wherein each hollow needle has a beveled end.

4. The method according to claim 1, wherein the needle(s) is/are moved sequentially between the first face and the second opposite face of the fibrous texture, the needle(s) being stopped at intermediate positions between these two faces, a determined dose of loaded suspension being injected into the texture at each intermediate position.

5. The method according to claim 1, wherein the at least one needle is moved continuously between the first face and the second opposite face of the fibrous texture, the loaded suspension being injected continuously at a determined flow rate into the fibrous texture.

6. The method according to claim 1, wherein, during the injecting of the loaded suspension, the fibrous texture is placed in a compaction tooling comprising at least on one face one or more through holes for the needle(s).

7. The method according to claim 1, wherein the injecting of the loaded suspension into the fibrous texture is carried out without draining a liquid phase of the suspension.

8. A method for manufacturing a part made of composite material comprising:
   forming a fibrous texture by three-dimensional or multilayer weaving between a plurality of yarns,
   injecting a loaded suspension into the fibrous texture according to claim 1, the loaded suspension comprising at least one liquid or solid precursor of a matrix,
   compacting the injected fibrous texture,
   transforming said at least one precursor into a matrix.

9. The method according to claim 8, wherein the yarns of the fibrous texture are formed of refractory ceramic fibers, the loaded suspension containing refractory ceramic particles as a solid precursor of a ceramic matrix, the method comprising heat treating the refractory ceramic particles present in the fibrous texture in order to form a refractory ceramic matrix in said texture.

10. The method according to claim 9, wherein the refractory ceramic particles are made of a material chosen from: alumina, mullite, silica, an aluminosilicate, an aluminophosphate, zirconia, a carbide, a boride and a nitride.

11. The method according to claim 8, wherein the yarns of the fibrous texture are formed of fibers consisting of one or more of the following materials: alumina, mullite, silica, an aluminosilicate, a borosilicate, silicon carbide and carbon.

* * * * *

UNITED STATES PATENT AND TRADEMARK OFFICE
CERTIFICATE OF CORRECTION

| | | |
|---|---|---|
| PATENT NO. | : 11,655,193 B2 | Page 1 of 1 |
| APPLICATION NO. | : 16/648427 | |
| DATED | : May 23, 2023 | |
| INVENTOR(S) | : Pascal Diss et al. | |

It is certified that error appears in the above-identified patent and that said Letters Patent is hereby corrected as shown below:

On the Title Page

In Item (56) References Cited: FOREIGN PATENT DOCUMENTS:
Column 2, Line 1 should read:
CN 104552749 A 04/2015
Page 2, Column 2, Line 13 should read:
RU 2559440 C2 08/2015

Signed and Sealed this
Fourth Day of July, 2023

Katherine Kelly Vidal
*Director of the United States Patent and Trademark Office*